June 11, 1940.  K. W. ATWATER  2,204,171
AUTOMATIC LUBRICATION DEVICE
Filed Jan. 24, 1938  2 Sheets-Sheet 1

Inventor:—
Karl W. Atwater;

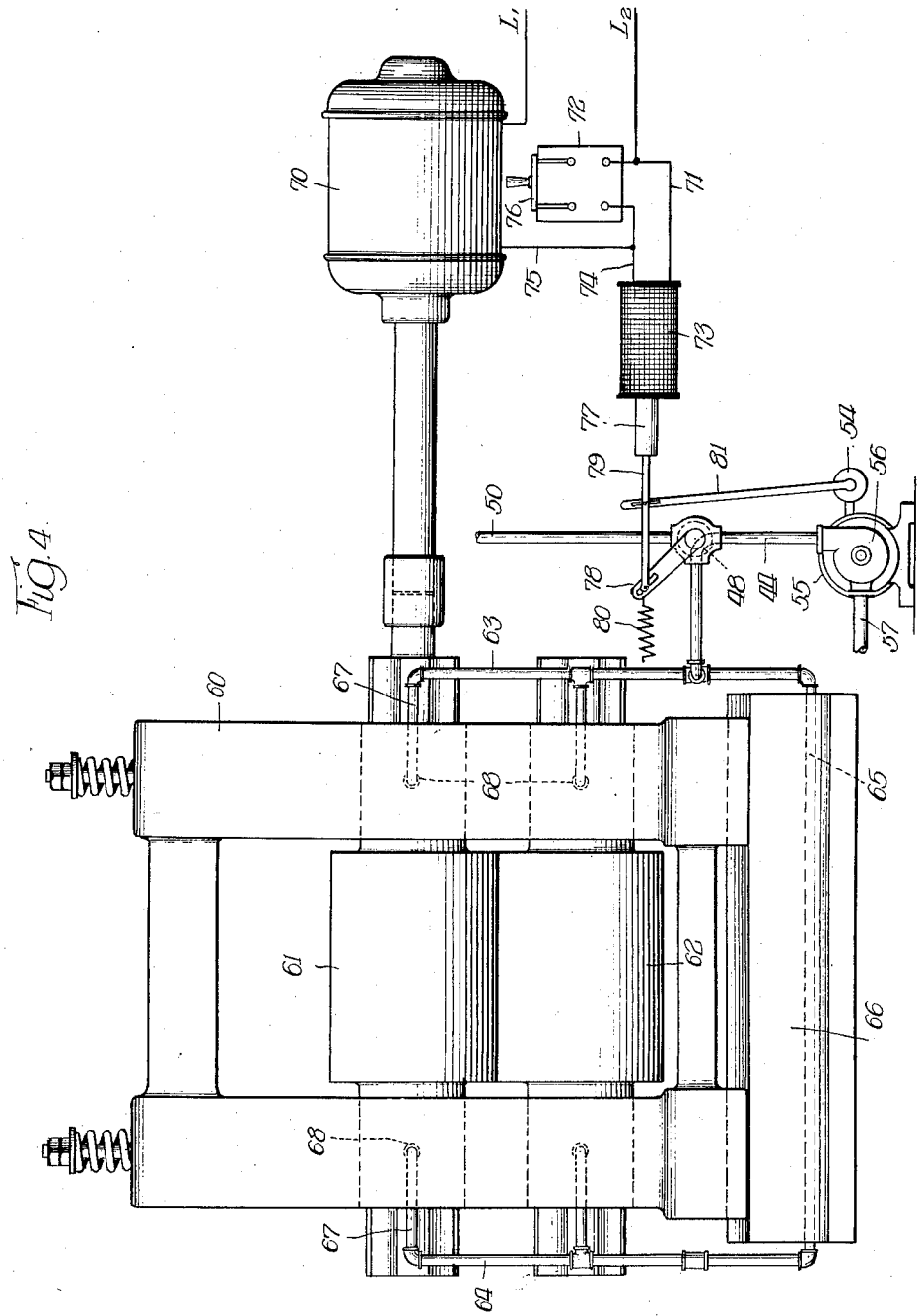

Patented June 11, 1940

2,204,171

UNITED STATES PATENT OFFICE 2,204,171

AUTOMATIC LUBRICATION DEVICE

Karl W. Atwater, Pittsburgh, Pa.

Application January 24, 1938, Serial No. 186,556

7 Claims. (Cl. 184—6)

The invention relates to rolling mills and has more particular reference to improvements in the cooling means therefor for cooling the roll necks and bearings and which will prevent rusting of said roll necks during the time the rolling mill remains idle.

It has been common practice in the operation of rolling mills to cool the roll necks or shafts of the rolls by means of a spray of cooling water which has proven satisfactory where simultaneously a lubricant is used on the metallic bearing to prevent the formation of rust on the roll necks when the mill is not in operation.

During recent years non-metallic bearings have displaced metallic bearings as greater economy in the rolling operation is obtained by eliminating all lubricants in the cooling except the water sprays. However, it was soon discovered that a coating of rust would form on the roll necks during the period when the mill was not in operation unless the roll necks were given a coating of oil, grease or other lubricant shortly after operation of the mill ceased. The above described method of cooling the bearings and necks of the rolls and protecting the same from rusting during non-use was adequate and satisfactory except that in many cases the additional work of lubricating the roll necks at the time when the rolling mill stopped operation involved an additional expense in labor and a factor of uncertainty as to whether the necessary duties of lubricating the roll necks for the idle period had been performed.

An obvious disadvantage due to the formation of rust on the roll necks is that the rolls are exceedingly difficult to start and in some cases the torque may be increased beyond safe limits. Also rust on the roll necks has a grinding effect upon the bearing surface, thereby causing excessive wear of the bearings in which the rolls are running.

An object of the invention therefore is to provide an improved cooling system for rolling mills which will spray the roll necks with water during operation and automatically upon shutting off the water will deliver a predetermined quantity of oil to lubricate and coat the roll necks, thereby preventing the formation of rust on the roll necks during the time the mill remains idle.

A more specific object of the invention resides in the provision of time controlled means that can be adjusted for determining the proper quantity of oil or other suitable lubricant to be delivered to the necks of the rolls and which will be supplied thereto through the same pipe line system that previously conveyed the cooling water.

With these and various other objects in view, the invention may consist of certain novel features of construction and operation as will be more fully described and particularly pointed out in the specification, drawings and claims appended hereto.

In the drawings which illustrate an embodiment of the invention and wherein like reference characters are used to designate like parts—

Fig. 4 is a diagrammatic view illustrating automatic means for controlling the discharge of water and oil to the roll necks of a rolling mill.

Figure 1:
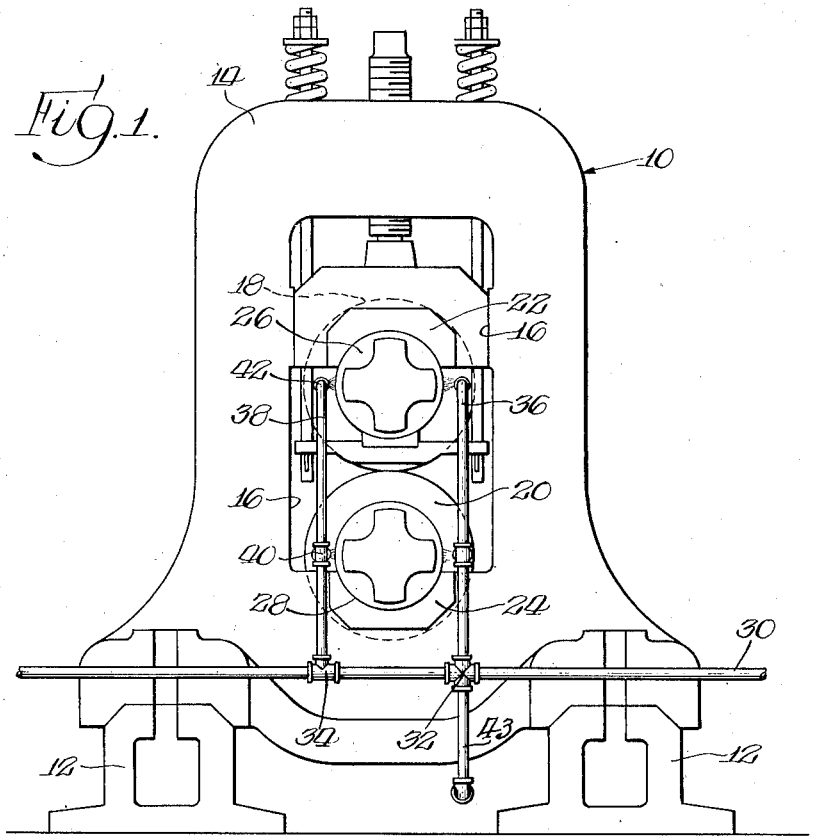
Figure 1 is an elevational view of a two-high rolling mill equipped with the improved cooling and automatic lubricating means of the invention.

Referring to the drawings, the two-high rolling mill shown in Figure 1 consists essentially of a mill housing 10 supported from any suitable base or foundation by the supporting members 12. The frame members 14 comprising the mill housing are each formed with a vertically disposed substantially rectangular opening 16 within which is inserted the bearing members for journalling the working rolls 18 and 20. Said bearing members, identified by numerals 22 and 24, respectively, may comprise heavy blocks of lignum vitae in accordance with my prior Patent No. 1,771,108 granted July 22, 1930, or said blocks may be formed from any suitable non-metallic composition that has been compressed to form a solid homogeneous bearing unit. The inner surface of the bearing blocks are shaped to conform to the contour of the neck of the particular roll journalled thereby. Thus the neck or shaft portion 26 formed on the respective ends of roll 18 is journalled by bearing 22, whereas, the neck 28 formed on the lower working roll 20 is journalled by the bearing 24.

In the operation of rolling mills both for rolling ferrous and non-ferrous material it has been common practice to cool the roll necks or shafts of the rolls by means of a spray of cooling water. This cooling is satisfactory where simultaneously a lubricant is used on metallic bearings to prevent any formation of rust on the roll necks when the mills are not in operation. However, when using non-metallic bearings cooling can be accomplished by the use of water sprays only. With the use of various makes and types of non-metallic roll neck bearings it developed that on the roll necks or shafts a coating of rust would form during the period when the mills were not in operation unless such roll necks or shafts were given a coating of oil, grease or other similar lubricant at the time when the mill operation ceased. The invention proposes to accomplish automatic lubrication of the roll necks following the stopping of the mill so as to eliminate the additional expense involved for labor and the factor of uncertainty as to whether the duties of lubricating the necks for the idle period had been performed. In accordance with the invention lubricating oil is supplied to the bearings and roll necks immediately following the shutting off of the water supply and said oil is delivered through the same pipe line system through which previously flowed the cooling water.

Figure 2:
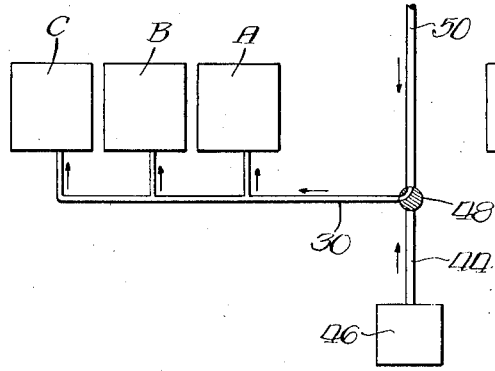
Figure 2 is a diagrammatic view illustrating the improvements of the invention as applied to a continuous type mill consisting of three roll stands.

As shown in Figure 1 the two-high mill disclosed is equipped with a water supply pipe 30 which passes alongside of the mill housing. At spaced points in vertical alignment with the extremities of the bearing blocks the supply pipe 30 is provided with T connections 32 and 34 which join with the vertically disposed pipes 36 and 38, respectively. It will be observed that the vertical pipes 36 and 38 are disposed adjacent the roll necks of the rolls 20 and 22 and that each pipe is equipped with an intermediate spray 40 for delivering cooling water to the neck of roll 20 and also equipped with a spray 42 at its upper end for delivering cooling water to the neck of the upper roll 22. It may be assumed that the roll stand disclosed is one comprising a continuous type mill and therefore the supply pipe 30 continues beyond the T 34 for connecting with the next adjacent stand, as will be better understood by reference to the diagrammatic illustration of a continuous type mill comprising three mill stands identified as A, B and C in Figure 2. A connection 43 joins with the T 32 and extends under the mill housing to the opposite side thereof for delivering fluid to sprays similar to 40 and 42.

The improvements of the invention essentially comprise an oil supply line 44 leading from any suitable oil reservoir 46 and a three-way valve 48 which will connect either the water supply main 50 or oil supply line 44 with pipe 30. When the former is connected the sprays will deliver water to the roll necks but when the oil supply line 44 is connected with pipe 30 the sprays deliver oil for lubricating the roll necks. The reservoir 46 may contain a predetermined amount of lubricant such as a flowable oil which is fed to the oil line 44 under pressure by any suitable form of pump not shown. When the three-way valve 48 is rotated to turn off the water supply the oil line 44 is automatically connected with line 30 and an amount of oil will be delivered through pipe 30 to the sprays sufficient to thoroughly coat and lubricate the roll necks and bearings of the rolling mill, thereby preventing rusting of said roll necks.

The installation of the oil supply can be conveniently constructed so as to receive a re-fill from the main oil supply of the plant during the time water is being delivered through the supply pipe 30 to the roll stands. Electrical limit switches and contactor switches well known in the art can be connected to an electric motor forming the driving means for an oil pump located in the oil main and which will therefore deliver oil under pressure for a predetermined duration.

Figure 3:
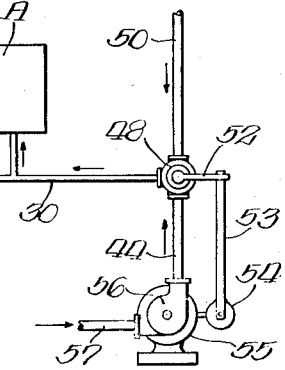
Figure 3 is a diagrammatic view illustrating a modified form of the invention as applied to a continuous type mill consisting of three roll stands.

A typical installation is shown in Figure 3, wherein the three-way valve 48 is provided with a handle 52 suitably connected to rod 53 which is joined at its opposite end to a time controlled switch 54. Said switch has electrical connection with an electric motor 55 which comprises the power means for driving the oil pump 56. Upon rotation of handle 52 to shut off the water supply to the line 30 the time controlled switch 54 will be actuated to energize the electric motor 55, causing actuation of the pump which will draw oil from the main 57 and force the same under pressure through pipe 44 which is connected by the three-way valve to the main 30. Oil will therefore be delivered at the sprays 40 and 42 for the purpose of lubricating the roll necks and bearings of the roll stands A, B and C, and said oil supply will continue for a duration of time which can be predetermined by adjustment of the time controlled switch 54. When the current supply to the electric motor is discontinued the pump will stop and the oil supply to the roll stands will cease.

If the power to the roll stand is discontinued about the time the three-way valve is rotated to shut off the water, it is possible to lubricate the roll necks of the rolls while they are revolving under momentum prior to coming to rest. The several rotations of the roll stands while lubricant is being supplied to the necks thereof will thoroughly coat said necks and also lubricate the bearings.

In Figure 4 the two-high rolling mill shown in front elevation includes the mill housing 60 journalling the rolls 61 and 62 and equipped with water supply pipes 63 and 64 disposed on the respective sides of the mill. Pipes 63 and 64 are joined by the connection 65 extending through the base 66 of the rolling mill and each of said supply pipes is also provided with extensions 67 extending inwardly to the bearing of each roll and terminating in sprays 68, whereby the cooling fluid is discharged against the roll necks. In this modification water is supplied to said roll necks during operation of the mill but automatically upon shutting off the current to the electric motor 70 driving the said mill a predetermined quantity of oil will be discharged from said sprays for lubricating and coating the said roll necks to prevent the formation of rust during the time the mill remains idle.

The power to the electric motor 70 is indicated by the power lines $L_1$ and $L_2$. $L_2$ has connection with the conductor 71 joining one terminal of the switch 72 with the solenoid 73. In a like manner conductor 74 connects the other terminal of the switch with said solenoid and has the conductor 75 leading therefrom, which completes the circuit to the motor 70. When the circuit to the electric motor 70 is closed by the switch 76 the solenoid 73 will be energized, thereby attracting its plunger 77 and actuating lever 78 operatively connected to said plunger by the rod 79. The lever 78 will be rotated against the tension of the spring 80 causing in turn rotation of the three-way valve 48 to connect the water supply main 50 with the pipes 63 and 64 of the rolling mill. The armature will remain energized as long as current is being supplied to the motor or as long as the operation of the mill continues.

Upon stopping the rolling mill the current supplied to the motor 70 is of course interrupted by actuation of switch 76 and the solenoid 73 is thereupon deenergized. The spring 80 will rotate the lever 78 and the three-way valve to its initial position, cutting off the water supply and connecting the pipes 63 and 64 of the rolling mill with the line 44. Pipe 44 has connection with the pump 56 to which oil is supplied by the oil supply main 57. Simultaneously with the return of lever 78 to its initial position the time control switch 54 is actuated through the instrumentality of the rod 81 having connection with rod 79. The said switch has electrical connection with the motor 55 which comprises the power means for driving the said pump 56 and accordingly said motor will be energized for a length of time sufficient to supply the proper quantity of oil to the roll necks of the rolling mill. The proper length of time may of course vary for different installations but this can be adjusted as desired by setting the time control switch 54.

In the structure shown in Figure 4 it will therefore be seen that during the operation of the mill the roll necks are supplied with water from the water main 50 but automatically upon shutting off the current to said mill a predetermined quantity of oil will be discharged from the sprays 68, thereby lubricating and coating the roll necks to prevent the formation of rust while the mill remains idle.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. In a rolling mill, the combination with a pair of working rolls, of means journalling said rolls, comprising bearing members engaging the necks thereof, means cooling said roll necks and bearings comprising water sprays delivering cooling water thereto, a system of pipes for conducting the cooling water to said sprays, an oil supply line, and valve means connecting said system of pipes with either said water main or said oil supply line, whereby said sprays may deliver either cooling water or lubricating oil to the roll necks of said working rolls.

2. In a rolling mill, the combination with a pair of working rolls, means journalling said rolls comprising bearing members engaging the necks thereof, means cooling said roll necks and bearings comprising water sprays delivering cooling water thereto, a system of pipes for conducting the cooling water to said sprays, a water supply main, an oil supply line joining with said water supply main, and valve means at the junction thereof for connecting said system of pipes with either said water supply main or said oil supply line, whereby said sprays may deliver either cooling water or lubricated oil to the roll necks of said working rolls.

3. In a rolling mill, in combination, means for cooling the shafts of the working rolls thereof comprising water sprays delivering cooling water to said shafts, a water supply main for supplying water to said sprays, an oil supply line joining with said water supply main, means located at the junction for connecting either said water supply main or said oil supply line with said sprays, whereby said sprays may deliver cooling water to the shafts for cooling the same or oil for lubricating the shafts, and time controlled means determining the quantity of oil supplied by said oil line.

4. In a rolling mill, in combination, means for cooling the shafts of the working rolls thereof comprising water sprays delivering cooling water to said shafts, a water supply main for supplying water to said sprays, an oil supply line joining with said water supply main, a valve at said junction for connecting either said water supply main or the oil supply line with said sprays, whereby said sprays may deliver water to said shafts for cooling the same or oil for lubricating the shafts, and time controlled means rendered operative upon actuation of the valve to connect the oil supply line with said sprays for controlling the quantity of oil supplied by said oil line.

5. In a rolling mill, the combination with a pair of working rolls, of means journalling said rolls, comprising bearing members engaging the necks thereof, means cooling said roll necks and bearings including sprays for delivering cooling water thereto, a system of pipes for conducting the cooling water to said sprays, an oil supply line, valve means for connecting said system of pipes with either a water supply main or said oil supply line, and automatic means actuating said valve means to deliver either cooling water or lubricating oil to said sprays depending on whether said rolling mill is operating.

6. In a rolling mill, the combination with a pair of working rolls, of means journalling said rolls, comprising bearing members engaging the necks thereof, means cooling said roll necks and bearings including sprays for delivering cooling water thereto, a system of pipes for conducting the cooling water to said sprays, an oil supply line, valve means for connecting said system of pipes with either a water supply main or said oil supply line, and electro-magnetic means for automatically actuating said valve means, said electro-magnetic means being energized during operation of the rolling mill and being constructed and arranged to hold said valve means when thus energized so as to deliver cooling water to the sprays.

7. In a rolling mill, the combination with a pair of working rolls, of means journalling said rolls comprising bearing members engaging the necks thereof, an electric motor operatively connecting with at least one of said rolls for rotating the same, means cooling said roll necks and bearings including sprays for delivering cooling water thereto, a system of pipes for conducting the cooling water to said sprays, an oil supply line, a valve for connecting said system of pipes with either a water supply main or said oil supply line, electro-magnetic means electrically connected to a source of current so that the same is energized when said electric motor is energized, and connections from said electro-magnetic means to said valve, whereby said valve is actuated to deliver cooling water to the sprays when the electro-magnetic means is energized and to deliver oil to said sprays when the electro-magnetic means is de-energized.

KARL W. ATWATER.